United States Patent [19]

Baillie

[11] Patent Number: 5,049,008
[45] Date of Patent: Sep. 17, 1991

[54] AIR PULSE DISCHARGE CONTROL VALVE FOR FLUIDIZING DRY PARTICULATE MATERIAL

[75] Inventor: Lloyd A. Baillie, Plano, Tex.

[73] Assignee: Atlantic Richfield Company, Los Angeles, Calif.

[21] Appl. No.: 508,213

[22] Filed: Apr. 11, 1990

Related U.S. Application Data

[62] Division of Ser. No. 302,536, Jan. 25, 1989, abandoned.

[51] Int. Cl.⁵ .................... B65G 53/22; B65G 53/38; B65G 69/06
[52] U.S. Cl. .................................. 406/85; 406/91; 406/136; 406/138; 137/469; 137/537; 137/624.14
[58] Field of Search ................... 406/85, 91, 138, 136; 222/3, 195; 137/624.14, 469, 537

[56] References Cited

U.S. PATENT DOCUMENTS

| | | | |
|---|---|---|---|
| 3,861,753 | 1/1975 | Lesk et al. | 406/85 X |
| 3,976,232 | 8/1976 | Heidebroek | 406/91 |
| 4,118,074 | 10/1978 | Solt | 406/85 |
| 4,165,820 | 8/1979 | Dugge et al. | 406/85 X |
| 4,591,075 | 5/1986 | Eriksson | 406/138 X |

Primary Examiner—Margaret A. Focarino
Assistant Examiner—James M. Kannofsky
Attorney, Agent, or Firm—Michael E. Martin

[57] ABSTRACT

A self acting pressure air pulse control valve for use with fluidizing and pneumatic conveying systems for dry particulate material comprises a housing having a chamber in which a plate type closure member and an actuating piston are disposed and interconnected by an elongated actuating rod. A spring engages the actuating rod through a pivotally supported lever and biases the closure member toward a closed position. Pressure air acts across the face of the closure member to allow the valve to crack open whereupon pressure air acting on the larger actuating piston face snaps the valve to the fully open and unrestricted flow position. A reduction in pressure of the air flowing through the valve allows the biasing spring to reclose the valve to repeat its operating cycle.

1 Claim, 2 Drawing Sheets

AIR PULSE DISCHARGE CONTROL VALVE FOR FLUIDIZING DRY PARTICULATE MATERIAL

This is a division, of application Ser. No.07/302,536, filed Jan. 25, 1989, now abandoned.

BACKGROUND OF THE INVENTION

1. Field of the Invention

The present invention pertains to a valve mechanism particularly adapted for delivering pulses of pressure air to a fluidizing system for a particulate material bulk storage tank and the like.

2. Background

Many applications of compressed air for pneumatic conveying, fluidizing dry particulate material and the like require or desirably should include a valve for controlling the flow of pressure air to deliver a pulse or blast of pressure air followed by a cessation of air flow, at least momentarily. This type of control valve conserves pressure air as well as enhances the action of the pressure air such as in fluidizing dry bulk particulate material in storage systems and the like. One application of a control valve in accordance with the present invention is advantageously found in a dry cement blending system of the type described in U.S. Pat. application Ser. No. 07/038,693 filed Apr. 15, 1987 and the apparatus described in U.S. Pat. application entitled: Method and Apparatus to Conduct Fluidization of Cohesive Solids by Pulsating Vapor Flow, both in the name of Lloyd A. Baillie and assigned to the assignee of present invention.

SUMMARY OF THE INVENTION

The present invention pertains to a unique valve for delivering timed pulses of pressure air from a source to an end use such as a fluidizing or pneumatic conveying system for a dry particulate material bulk storage apparatus.

In accordance with an important aspect of the present invention, there is provided a self controlled valve for delivering a blast or pulse of pressure air, which valve is self opening and closing. The valve is responsive to the pressure of a pressure fluid such as compressed air at an inlet port to the valve and within a chamber in the valve to move from a closed position to an initial open position, then move rapidly to a full open position and followed by a reclosing action, all under the control of pressure of the fluid which in turn is being controlled by the valve.

Still further in accordance with the present invention there is provided an air pulse type control valve which is particularly adapted to be controlled by the pressure of air in a reservoir or source of air with which the valve communicates and controls the flow therefrom and wherein the valve is provided with an actuating member having a plurality of spaced pressure responsive surfaces mounted thereon for controlling the initial opening of the valve followed by rapid and complete opening and gradual closing of the valve. In this way the total amount of pressure air used for fluidizing as well as other applications is conserved, a shock wave or air blast action is provided for operating certain devices and the valve is self controlling to deliver a high pressure blast or pulse of pressure air. The actuating mechanism preferably includes an actuating stem or rod on which adjustable piston members are mounted and which are operable to form a closure member and an actuating member, respectively.

In accordance with another aspect of the present invention, a dry bulk material storage system is provided which utilizes a pressure air pulse type valve in accordance with the present invention in an advantageous manner.

The above described advantages and features of the present invention as well as other superior aspects thereof will be further appreciated by those skilled in the art upon reading the detailed description which follows in conjunction with the drawing.

DESCRIPTION OF A PREFERRED EMBODIMENT

Figure 1:
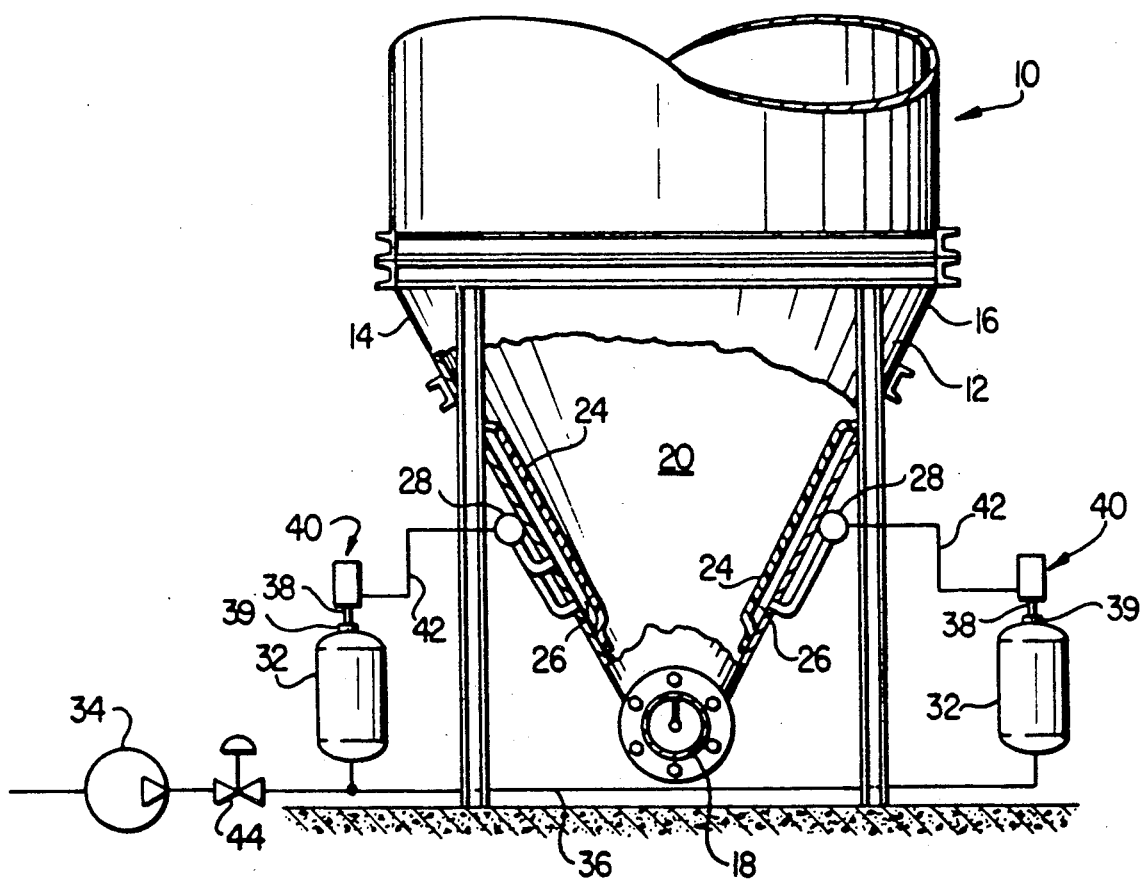
FIG. 1 is a side elevation, partially sectioned, of a dry particulate material storage bin and pressure air fluidizing system including the pulse type control valve of the present invention.

In the description which follows, like parts are marked throughout the specification and drawing with the same reference numerals, respectively. The drawing figures are not necessarily to scale and certain features of the invention may be shown in schematic form or exaggerated in scale in the interest of clarity and conciseness.

Referring to FIG. 1, there is shown a partial side elevation of a dry particulate material bulk storage bin, generally designated by the numeral 10. The bin 10 is particularly adapted for storing particulate flowable materials such as dry cement, flour and other relatively fine powdered materials. The bin 10 includes a depending portion 12 having sloping sidewalls 14 and 16 which converge toward an outlet trough portion 18. The trough portion 18 may include an auger or screw type conveyor disposed therein for displacing material from the bin. An interior chamber 20 formed within the bin 10 is delimited in part by the sidewalls 14 and 16 and these walls are each fitted with at least one fluidizing pad generally designated by the numeral 24. Each of the pads 24 is preferably constructed of a somewhat porous canvas like material and is suitably secured to the interior surface of the walls 14 and 16, respectively, around its perimeter. The pads 24 are responsive to the injection of pressure air into a narrow space 26 formed between each pad and the interior wall surface of the walls 14 and 16 to flex the pad and to disseminate pressure air into the chamber 20 to assist in fluidizing or causing the material stored therein to flow when such action is wanted. The operation of the pads 24 is enhanced by the injection of a relatively high pressure pulse or blast of pressure air into the spaces 26 by way of respective conduits or manifolds 28 disposed on the exterior surfaces of the walls 24 and 26, respectively. The manifolds 28 are adapted to include one or more pressure air discharge pipes connected thereto and suitably connected to the walls 14 and 16 for discharging pressure air through suitable openings in the walls into the spaces 26.

Pressure air is supplied for operating the fluidizing pads 24 by way of respective sources including reservoir tanks 32 which may receive pressure air from a common source such as a compressor 34 by way of a suitable supply conduit 36. The tanks 32 each include a fitting 39, see FIG. 2, forming a discharge port and which is connected to an inlet conduit 38 of a self controlling air blast or pulse type control valve 40. The control valves 40 are each connected to a manifold 28 by way of a suitable conduit 42. In one mode of operation of fluidizing material in the chamber 20 repeated pulses or blasts of pressure air are emitted into the chambers 26 by way of the reservoir tanks 32 and the valves 40. A control valve 44 may be suitably remotely controlled to provide pressure air to the tanks 32. With the supply of pressure air to the tanks 32 the pressure in each tank increases until the respective control valves 40 self actuate to deliver a pulse or blast of pressure air through the respective manifolds 28 into the spaces 26. Thanks to the construction and unique operating characteristics of the valve 40, as long as fluidizing air and fluidizing action are required for the bin 10, the only control required for the system shown is to open the valve 44 so that pressure air may be supplied to the respective reservoir tanks 32 and the valves 40 will each self actuate to deliver repeated pulses or blasts of pressure air to the manifolds 28.

Figure 2:
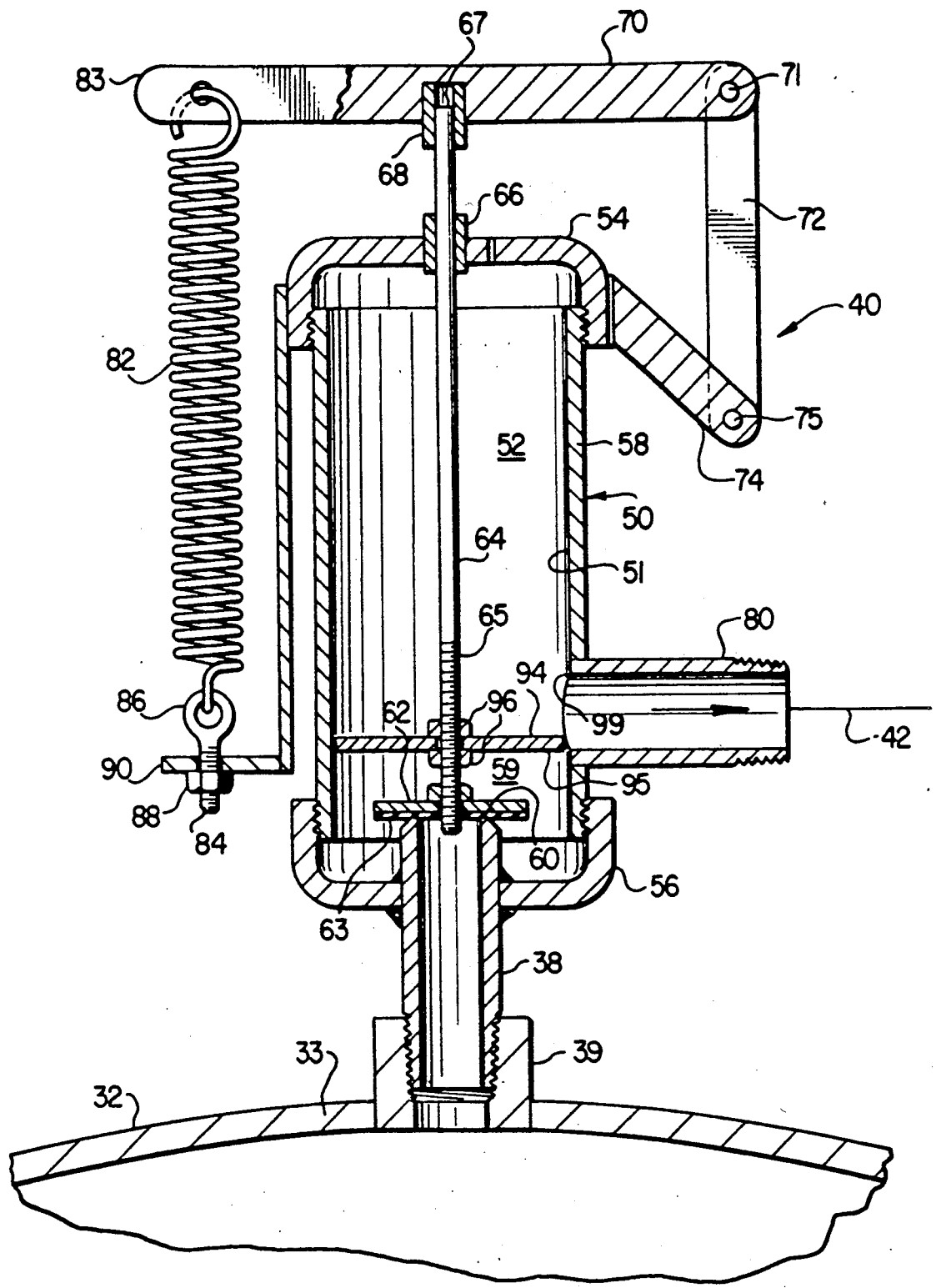
FIG. 2 is a vertical central section view of the valve of the present invention.

Referring now to FIG. 2, the structural details of the valve 40 are shown by way of a vertical central section view of the valve. In a preferred arrangement the valve 40 is directly connected to the tank or reservoir 32 by way of the relatively short conduit 38 which may be integral with the valve itself and threadedly coupled to the fitting 39 which is integral with a top wall 33 of the tank 32. The valve 40 includes a generally cylindrical body member 50 forming an interior cavity or chamber 52 which is delimited at its opposite ends by opposed head members 54 and 56 which may be threadedly coupled to a cylindrical barrel portion 58 of the body 50. Alternatively, one of the head members 54 or 56 may be formed integral with the barrel portion 58. The conduit 38 extends through the head member 56 and is suitably secured thereto such as by welding or a threaded connection, not shown, and into a sub-chamber portion 59 of the chamber 52. A transverse upper edge 60 of conduit 38 forms a seat surface for a disk or plate type closure member 62. The closure member 62 may have a suitable elastomeric face 63 for engagement with the seat surface 60 to form a fluid tight seal and to minimize damage to the seat surface and the closure member upon impacting the seat surface during closure movement.

The closure member 62 is connected to an elongated actuating rod or stem 64 which extends through the chamber 52 and through a suitable bearing or guide part 66 formed in the head 54. The actuating rod 60 extends from the valve body 50 and its distal end 67 is loosely journaled in a bushing 68 connected to an actuating 70. The lever 70 is supported on the body 50 by a link member 72 which is pivotally connected to a support arm 74 suitably secured to the head 54. Pivot connections are formed between the members 72 and 74 as indicated at 75 and between the members 70 and 72 as indicated at 71. This arrangement 35 eliminates any lateral binding action on the rod 64 as it moves axially up or down, viewing FIG. 2, in response to operation of the valve 40.

The valve 40 further includes a discharge conduit 80 which extends laterally from the barrel 58 and opens into the chamber 52 in the position of the valve shown in FIG. 2. A coil extension spring 82 is connected at one end to the distal end 83 of the lever arm 70 and at its opposite end to a threaded member 84 having a suitable loop or eye portion 86 for connection to the end of the spring 82. A nut 88 is threaded onto the member 84 and engages a support bracket 90 which depends from and is suitably secured to the head 54 as illustrated. The nut 88 may be adjusted to increase the tension on the spring 82 and thus increase the axially directed valve closing force exerted on the stem 64 and the closure member 62 acting against any pressure force on the face of the closure member exposed to the pressure air in the reservoir or tank 32 and the conduit 38. Accordingly, the pressure at which the valve closure member 62 disengages from the seat 60 may be adjusted by adjusting the tension in the spring 82.

A particular advantage of the valve 40 resides in the provision of an actuator plate or piston member 94 which is supported on the rod 64 between opposed locknuts 96 which are threadedly engaged with a threaded portion 65 of the rod. As illustrated in FIG. 2, in the closed position of the valve 40 the actuating piston 94 is positioned such that the opening 99 between the chamber 52 and the discharge conduit 80 is essentially out of communication with the chamber portion 59, although a small circumferentaal clearance is provided by the piston 94 with respect to the inner wall surface 51 of the barrel 58. Accordingly, as pressure air enters the chamber portion 59, upon slight movement of the closure member 62 away from the seat 60, the pressure in the chamber 59 increases rapidly and, acting on the larger area of the surface 95 of the piston 94 causes the rod 64 and the closure member 62 to move rapidly away from the seat 60 so that relatively unrestricted air flow occurs from the conduit 38 to the discharge conduit 80. In this way, a rapid high pressure blast or pulse of pressure air may be discharged by the valve 40 to the spaces 26, FIG. 1, to cause the fluidizing pads 24 to flex rapidly and to provide for dissemination of fluidizing air through the porous material of the fluidizing pads.

As soon as the closure member 62 moves away from the seat 60 and an initial blast or flow of air occurs through the valve 40, the pressure in the tank 32 will decrease sufficiently so that the resultant pressure force acting on the closure member 62 and the piston 94 will reduce to the point where the spring force exerted on the rod 64 will reclose the valve by moving the closure member 62 into engagement with the seat 60. Once this action has occurred and the source of pressure air such as the compressor 34 builds pressure in the tank 32 to the point wherein the closure member is again moved off of the seat surface 60, the operation of the valve will be repeated. Because the compressor 34 is continuing to supply air to the tank 32 at the same time that the closure member 62 is attempting to reseat, the exact pressure in tank 32 when this occurs will depend on the rate at which the compressor 34 is supplying pressure air, and also on the position of piston 94 with respect to discharge conduit 80. It is for this reason that locknuts 96 are provided for adjusting the position of the piston 94. Reseating occurs when the pressure in chamber portion 59 acting against piston 94 is no longer sufficient to keep the closure member 62 away from seat surface 60. This pressure is determined by the air flow past piston 94 into discharge conduit 80. The air flow will be, at a minimum, the steady output of the compressor 34, plus whatever flow comes from the continuing depressurization of tank 32. Thus, the minimum pressure in the cycle is determined by compressor output and by the flow resistance of air past piston 94 just prior to reseating of closure member 62. The maximum pressure of the cycle occurs when the pressure in tank 32 acting on the smaller surface of closure member delimited by the seat area provides the same force as existed just prior to reseating.

The operation of the valve 40, particularly in conjunction with the system illustrated in Figure is believed to be readily understandable from the foregoing description. The valve 40 may be constructed of conventional engineering materials used for pneumatic valves. The ratio of the area of the surface 95 of the piston 94 to the face area of the closure member 62 exposed to the conduit 38 may be varied to control the speed with which the valve opens fully to provide the blast or pulse of pressure air through the chamber 59 and the conduit 80. Moreover, the pressure at which the closure member 62 unseats from the seat surface 60 may, of course, be adjusted by adjusting the tension in the spring 82. The locknuts 96 also provide for fine adjustment of the position of the piston 94 with respect to the opening 99.

Although a preferred embodiment of the present invention has been described in detail herein, those skilled in the art will recognize that various substitutions and modifications may be made to the embodiment disclosed without departing from the scope and spirit of the invention as recited in the appended claims.

What is claimed is:

1. In a system for fluidizing dry bulk particulate material disposed in a storage bin, the improvement comprising:

a storage bin having wall means defining an interior chamber for holding a quantity of dry flowable particulate material;

fluidizing pad means disposed adjacent to aid wall mans and defining between said wall means and said pad means at space;

conduit means in communication with said space for delivering a pulse of pressure air into said space to flex said pad means;

a reservoir tank for holding a quantity of pressure air;

means forming a source of pressure air in communication with said reservoir tank; and a self controlled air pulse delivering valve interposed between said reservoir tank and said conduit means for delivering pressure air to said spaced, said valve comprising a body member defining a chamber, means forming a pressure air inlet conduit opening into said chamber and means forming a pressure air discharge conduit opening into said chamber, means forming av above seat surface, a closure member engageable with said set surface to close off the flow of pressure air into and through said chamber, an actuating piston operably connected to said closure member and disposed insaid chamber and forming with said body member a subchamber into which pressure air may flow upon sunseating of said closure member from said seat surface, said actuating piton having a peripheral surface inclose proximity to wall means defining said chamber to substantially prevent the flow of pressure air past said piston in a nearly closed position of said valve, an actuating rod interconnecting said piston and said closure member, and means engageable with said rod for biasing said closure member in a losed position of said valve, said piston and said closure member being cooperable such that at a predetermined pressure in said inlet conduit said closure member unseats from said seating surface to provide for the flow of pressure air into said valve to act on said piston to move said valve rapidly from a near closed portion to a fully opened position to permit substantially unrestricted flow of pressure air from said inlet conduit to said discharge conduit, said piston being responsive to a reduced pressure insaid chamber to permit said means for biasing said actuating rod to move said closure member to he valve closed position.

* * * * *

UNITED STATES PATENT AND TRADEMARK OFFICE
CERTIFICATE OF CORRECTION

PATENT NO.   : 5,049,008
DATED        : September 17, 1991
INVENTOR(S)  : Lloyd A. Baillie It is certified that error appears in the above-identified patent and that said Letters Patent is hereby corrected as shown below:

column 5, lines 33 and 34, delete (aid wall mans), and insert - - - said wall means - - -.

column 5, line 35, delete (at), and insert - - - a - - -.

column 6, line 5, delete (spaced), and insert - - - space - - -.

column 6, line 11, delete (av above), and insert - - - a valve - - -.

column 6, line 12, delete (set), and insert - - - seat - - -.

column 6, line 17, delete (sunseating), and insert - - - unseating - - -.

column 6, line 19, delete (inclose), and insert - - - in close - - -.

column 6, line 25 delete (losed), and insert - - - closed - - -.

UNITED STATES PATENT AND TRADEMARK OFFICE
CERTIFICATE OF CORRECTION

PATENT NO. : 5,049,008

DATED : September 17, 1991

INVENTOR(S) : Lloyd A. Baillie

It is certified that error appears in the above-identified patent and that said Letters Patent is hereby corrected as shown below:

Col. 6, line 25 delete (losed), and insert -- closed --.

Signed and Sealed this

Nineteenth Day of January, 1993

Attest:

DOUGLAS B. COMER

*Attesting Officer*     Acting Commissioner of Patents and Trademarks